US010114975B1

(12) United States Patent
Sun et al.

(10) Patent No.: US 10,114,975 B1
(45) Date of Patent: *Oct. 30, 2018

(54) APPARATUS AND METHOD FOR DATA REDACTION IN A SEMI-STRUCTURED DOCUMENT DATABASE

(71) Applicant: MarkLogic Corporation, San Carlos, CA (US)

(72) Inventors: Junfeng Sun, Sunnyvale, CA (US); Caio Vinicius B. Milani, Campbell, CA (US)

(73) Assignee: MarkLogic Corporation, San Carlos, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/406,643

(22) Filed: Jan. 13, 2017

(51) Int. Cl.
*G06F 21/60* (2013.01)
*G06F 21/62* (2013.01)
*G06F 17/30* (2006.01)

(52) U.S. Cl.
CPC .... *G06F 21/6245* (2013.01); *G06F 17/30011* (2013.01); *G06F 17/30914* (2013.01); *G06F 17/30923* (2013.01); *H04L 2209/043* (2013.01)

(58) Field of Classification Search
CPC ........................................................ G06F 21/60
USPC ............................................................ 726/26
See application file for complete search history.

(56) References Cited

U.S. PATENT DOCUMENTS 8,826,443 B1 * 9/2014 Raman .................. G06F 11/004
726/26

* cited by examiner

*Primary Examiner* — Jacob Lipman
(74) *Attorney, Agent, or Firm* — Cooley LLP (57) ABSTRACT

An apparatus has a processor and a memory connected to the processor. The memory stores instructions executed by the processor to store a semi-structured document database including a collection of documents having semi-structured data formats. Data redaction rules are defined. Each data redaction rule includes a redaction type and a path expression to a redaction location within a semi-structured data format of a document within the collection of documents. The data redaction rules are applied to form redacted documents. The redacted documents are supplied.

16 Claims, 2 Drawing Sheets

APPARATUS AND METHOD FOR DATA REDACTION IN A SEMI-STRUCTURED DOCUMENT DATABASE

FIELD OF THE INVENTION

This invention relates generally to database administration. More particularly, this invention relates to data redaction techniques in a semi-structured document database.

BACKGROUND OF THE INVENTION

Increasing instances of data theft are leading to expanding demands for data safety. Applying data access controls in relational databases is facilitated by the structured nature of the data. Semi-structured documents do not have a formal structure, but they do contain tags or other markers to separate semantic elements and enforce hierarchies of records and fields. Databases with semi-structured documents do not enjoy the same structural precision as relational databases and therefore efforts to safeguard data in such databases are more challenging. Thus, there is a need for improved data security in semi-structured document databases.

SUMMARY OF THE INVENTION

An apparatus has a processor and a memory connected to the processor. The memory stores instructions executed by the processor to store a semi-structured document database including a collection of documents having semi-structured data formats. Data redaction rules are defined. Each data redaction rule includes a redaction type and a path expression to a redaction location within a semi-structured data format of a document within the collection of documents. The data redaction rules are applied to form redacted documents. The redacted documents are supplied.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
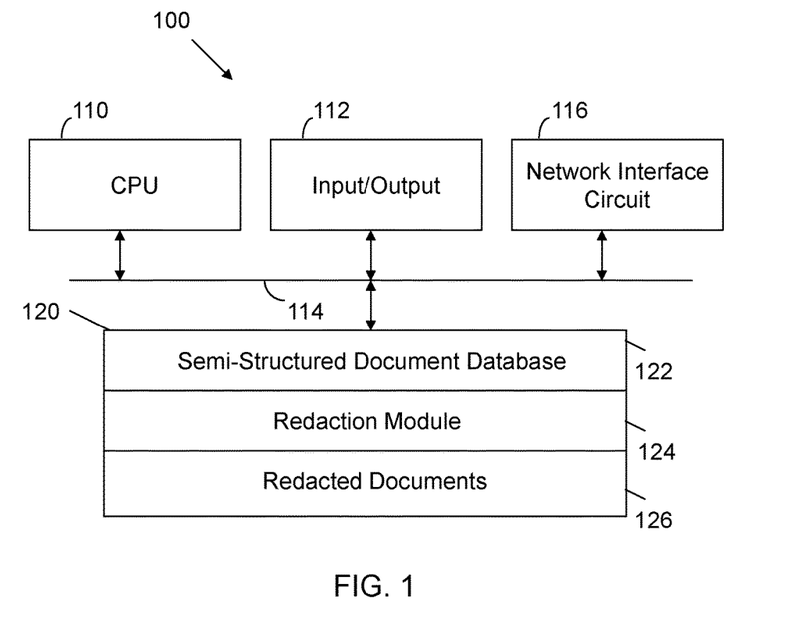
FIG. 1 illustrates a machine configured in accordance with an embodiment of the invention.

FIG. 1 illustrates a machine 100 configured in accordance with an embodiment of the invention. The machine 100 includes a central processing unit 110 connected to input/output devices 112 via a bus 114. The input/output devices 112 may include a keyboard, mouse, display and the like. A network interface circuit 116 is also connected to the bus 114. The network interface circuit 116 provides connectivity to a network, which may be any combination of wired and wireless networks. A memory 120 is also connected to the bus 114. The memory 120 stores a semi-structured document database 122. The memory 120 also stores a redaction module 124. The redaction module 124 includes instructions executed by the central processing unit 110 to implement operations disclosed herein. The redaction module 124 produces redacted documents 126.

Figure 2:
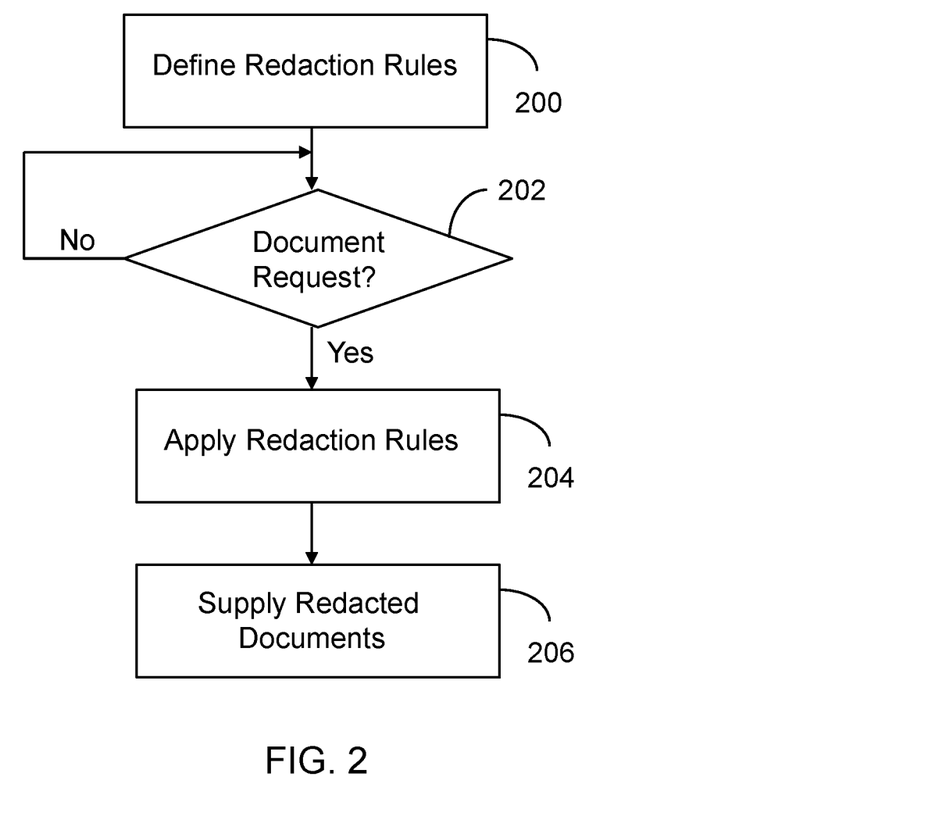
FIG. 2 illustrates processing operations associated with an embodiment of the invention.

FIG. 2 illustrates processing operations associated with an embodiment of the invention. Redaction rules are defined 200. Example redaction rules are disclosed below. The system then waits for a document request 202. In response to a document request (202—Yes), the redaction rules are applied 204. This produces redacted documents, which may then be supplied 206.

The invention is more fully appreciated in connection with the following terms and definitions.

| Term | Definition |
| --- | --- |
| Redaction | The process of modifying a document to obscure or conceal sensitive information. You can redact XML and JSON documents. |
| redaction rule | A specification of what portion of a document to redact and what function to use to make the modification. Rules can be defined in XML or JSON. |
| rule document | The document created in the schemas database when you install a rule in the schemas database. In one embodiment, a redaction document must contain exactly one rule. |
| rule collection | A database collection that only includes rule documents. A rule must be part of a collection before you can use it to redact documents. |
| redaction function | A function used to modify content during redaction. A redaction rule must include a redaction function specification. The system provides several built-in redaction functions. You can also create user-defined redaction functions. |
| source document | A database document to which you apply one or more redaction rules. Redacting a document creates an in-memory copy. The source document is unmodified. |
| masking | A form of redaction in which the original value is replaced by a new value. The new value may be deterministic or random. |
| deterministic masking | A form of redaction in which the original value is replaced by a new value, and the same input always yields the same output. |
| random masking | A form of redaction in which the original value is replaced by a new, random value. The same input does not result in the same output every time. |
| concealment | A form of redaction in which the original value is completely hidden. The XML element or JSON property containing the redacted value is usually hidden as well, depending on the semantics of the redaction operation. |

The redaction feature is a read transformation applied to XML, and JSON documents. A redacted document usually has selected portions removed, replaced, or obscured. For example, you might use redaction to eliminate email addresses or obscure all but the last 4 digits of credit card numbers when exporting a document. The export operation may be in connection with a bulk transfer of documents. Alternately, the export operation may be in response to a query that results in the supply of one or more redacted documents responsive to the query.

The table below describes some of the different techniques one can use to redact content. The details of what to redact and what techniques to apply depend on the requirements of an application.

| Redaction Type | Variations | Description |
| --- | --- | --- |
| Masking | full | The original value is completely obscured. For example, 123-45-6789 becomes ###-##-#### |
| | partial | A portion of the original value is retained. For example, 123-45-6789 becomes ###-##-6789 |

-continued

| Redaction Type | Variations | Description |
|---|---|---|
| | deterministic | The same input always results in the same redacted output. For example, the value "12345" becomes "11111"everywhere it appears in content selected for redaction. |
| | random | Each input results in a random redacted value. For example, the value "12345" might be masked as "1a2f578" in one place and "30da61b" in another. |
| | dictionary | The original value is substituted with a string (any text or numerical value) from a list of predefined strings that form a dictionary. |
| concealment | | The original value (and potentially the containing XML element or JSON property) is entirely removed. For example, if you conceal the value of /a/b, then <a><b>12345</b></a> might become </a>. |

An embodiment of the invention supports redaction through a command line tool and an XQuery library module that also supports Server-Side JavaScript. The redaction capability includes built-in support for common redaction tasks such as obscuring social security numbers and telephone numbers. You can also plug in your own redaction functions.

A redaction rule specifies what portion of a document contains information that needs to be redacted, and how to modify that portion. A rule expresses the business logic, independent of the documents to be redacted. A key component of a redaction rule is a redaction function that modifies the input nodes selected by the rule. In one embodiment of the invention, there are built-in redaction functions for redacting Social Security Numbers, telephone numbers, and email addresses.

One can apply redaction rules using a variety of tools and interfaces, including:

a command line tool
rdt:redact XQuery function
rdt.redact Server-Side JavaScript function The redaction workflow enables one to protect the business logic captured in a redaction rule independent of the documents to be redacted. The user who generates redacted documents need not have privileges to modify or create rules. For example, your users might have the following roles:

A Rule Administrator inserts one or more redaction rules into the Schemas Database. Each rule must be added to at least one rule collection.

A Rule User applies rule collections to documents in the content database, producing new, redacted documents.

Consider the following exemplary script, which will be referenced in examples below. The script inserts an XML, document with tags <personal>, <name>, <summary> and <id>. The script also inserts a JSON document with similar fields in a JSON format. The term "document" as used herein is any type of semi-structured data segment.

```
xquery version "1.0-ml";
xdmp:document-insert("/redact-gs/sample1.xml",
<personal>
<name>Little Bopeep</name>
<summary>Seeking lost sheep. Please call 123-456-7890.</summary>
<id>12-3456789</id>
</personal>,
xdmp:default-permissions( ), "gs-samples");
xquery version "1.0-ml";
xdmp:document-insert("/redact-gs/sample2.json", xdmp:unquote('
{"personal": {
"name": "Jack Sprat",
"summary": "Free nutrition advice! Call (234)567-8901 now!", "id": "45-6789123"
}}
'), xdmp:default-permissions( ), "gs-samples");
```

One can install rules using any document insert technique. This example uses XQuery. XQuery is a query and functional programming language that queries and transforms collections of structured and unstructured data. A redaction rule may be expressed as follows.

```
(: Apply redact-us-phone to //summary:)
xquery version "1.0-ml";
xdmp:document-insert("/rules/gs/redact-phone.xml",
<rule xml:lang="zxx" xmlns="http://marklogic.com/xdmp/redaction">
<description>Obscure phone numbers.</description>
<path>//summary</path>
<method>
<function>redact-us-phone</function>
</method>
<options>
<level>partial</level>
</options>
</rule>,
xdmp:default-permissions( ), "gs-rules"
);
(: Apply conceal to //id:)
xquery version "1.0-ml";
xdmp:document-insert("/rules/gs/conceal-id.json",
xdmp:unquote('
{"rule": {
"description": "Remove customer ids.", "path": "//id",
"method": {"function": "conceal"}
}}
'), xdmp:default-permissions( ), "gs-rules");
```

A redaction rule may have the following form.

```
<rule xml:lang="zxx" xmlns="http://marklogic.com/xdmp/redaction">
<description>Obscure phone numbers.</description>
<path>//summary</path>
<method>
<function>redact-us-phone</function>
</method>
<options>
<level>partial</level>
</options>
</rule>
```

The rule elements have the following effect:

description—Optional metadata for informational purposes.

path—Apply the redaction function specified by the rule to nodes selected by the path expression "//summary".

method—Use the built-in redaction function redact-us-phone to redact the value in a summary XML element or JSON property. By default, this function replaces all digits in a phone number by the character "#". You can tell this is a built-in function because method has no module child.

options—Pass a level parameter value of "partial" to redact-us-phone, causing the function to leave the last 4 digits of the value unchanged.

The expected result of applying this rule is that any text in the value of a node named "summary" that matches the pattern of a US phone number will be replaced. The replacement value uses the "#" number to replace all but the last 4 digits. For example, a value such as 123-456-7890 is redacted to ###-###-7890.

A JSON redaction rule has the following form.
{"rule": {
"description": "Remove customer ids.", "path": "//id",
"method": {"function": "conceal"}
}}

The rule properties have the following effect:

description—Optional metadata for informational purposes.

path—Apply the redaction function specified by the rule to nodes selected by the path expression "//id".

method—Use the built-in redaction function conceal to redact the id XML element or JSON property. This function will hide the nodes selected by path. You can tell this is a built-in function because method has no module child.

The expected result of applying this rule is to remove nodes named id. For example, if //id selects an XML element or JSON property, the element or property does not appear in the redacted output. Note that, if //id selects array items in JSON, the items are eliminated, but the id property might remain, depending on the structure of the document.

The following code is used to apply rules in the collection "gs-rules" to the sample documents.
xquery version "1.0-ml";
import module namespace rdt=
"http://marklogic.com/xdmp/redaction" at
"/MarkLogic/redaction.xqy";
rdt:redact(fn:collection("qs-samples"), "qs-rules")

The following table shows the result of redacting an XML sample document. Notice that the telephone number in the summary element has been partially redacted by the redact-us-phone function. Also, the id element has been completely hidden by the conceal function. The affected parts of the content are highlighted in the table.

| Stage | XML Content |
|---|---|
| Original Document | \<personal\><br>\<name\>Little Bopeep\</name\><br>\<summary\>Seeking lost sheep. Please call 123-456-7890.\</summary\><br>\<id\>123456\</id\><br>\</personal\> |
| Redacted Result | \<personal\><br>\<name\>Little Bopeep\</name\><br>\<summary\>Seeking lost sheep. Please call ###-###-7890.\</summary\><br>\</personal\> |

The following table shows the result of redacting a JSON sample document. Notice that the telephone number in the summary property has been partially redacted by the redact-us-phone function. Also, the id property has been completely hidden by the conceal function. The affected parts of the content are highlighted in the table.

| Stage | JSON Content |
|---|---|
| Original Document | {"personal": {<br>"name": "Jack Sprat",<br>"summary": "Free nutrition advice! Call (234)567-8901 now!",<br>"id": 234567<br>}} |
| Redacted Result | {"personal": {<br>"name": "Jack Sprat",<br>"summary": "Free nutrition advice! Call (###)###-8901 now!"<br>}} |

Rule documents are inserted into the Schemas database using the same interfaces as any other document. Consider the following when choosing what permissions to set on rule documents:

Users who should be able to create, modify, and delete rules require read and update permissions on the rule documents. You can think of these users as rule administrators.

Users who should be able to apply rules but not create, modify, or delete rules only require read permission on the rule documents. You can think of such users as rule users.

For example, if you create rule-admin and rule-reader roles, then you can enforce the access model described above by inserting rule documents similar to following example.

| Language | Example |
|---|---|
| XQuery | xdmp:document-insert (<br>$ruleURI,<br>$rule-definition,<br>(xdmp:permission("rule-admin", "read"),<br>xdmp:permission("rule-admin", "update"),<br>xdmp:permission("rule-reader", "read"))<br>) |
| JavaScript | declareUpdate( );<br>xdmp.documentInsert( ruleURI, ruleDefinition,<br>[xdmp.permission('rule-admin', 'read'),<br>xdmp.permission('rule-admin', 'update'),<br>xdmp.permission('rule-reader', 'read')]<br>) |

One can define redaction rules in XML or JSON. A rule definition includes at least the following:

An XPath expression defining the document components to which the rule applies.

A descriptor specifying either a built-in or user-defined redaction function. The function performs the redaction on the node(s) selected by the path expression.

A rule definition can include additional data, such as a description or options. Designing a rule should include the following tasks:

Choose a redaction strategy. For example, decide whether to mask or conceal redacted values.

Determine whether to use a built-in or user-defined redaction function.

The following example rule specifies that the built-in redaction function redact-us-ssn should be applied to nodes matching the)(Path expression //ssn. The redact-us-ssn function accepts a level parameter that specifies how much of the SSN to mask (full or partial). Use the options section of the rule definition to specify the level.

| Format | Example Rule |
|---|---|
| XML | \<rdt:rule xml:lang="zxx"<br>xmlns:rdt="http://marklogic.com/xdmp/redaction"\><br>\<rdt:description\>Mask SSNs\</rdt:description\><br>\<rdt:path\>//ssn\</rdt:path\><br>\<rdt:method\> |

-continued

| Format | Example Rule |
|---|---|
|  | `<rdt:function>redact-us-ssn</rdt:function>`<br>`</rdt:method>`<br>`<rdt:options>`<br>`<rdt:level>partial</rdt:level>`<br>`</rdt:options>`<br>`</rdt:rule>` |
| JSON | `{"rule": {`<br>`"description": "Mask SSNs", "path": "//ssn",`<br>`"method": { "function": "redact-us-ssn" }, "options":`<br>`{ "level": "partial" }`<br>`}}` |

Application of these rules to example documents above, results in the following:

-##-7890
-##-9012
-##-6789
-##-8901

One can also create custom XQuery or Server-Side JavaScript redaction functions and define rules that apply them. A user-defined function is identified in the method XML element or JSON property by function name, URI for the XQuery or Server-Side JavaScript module containing your function, and the module namespace URI if your function is implemented in XQuery.

The following example specifies that the user-defined redaction function "redact-name" should be applied to nodes matching the)(Path expression //name.

| Format | Example Rule |
|---|---|
| XML | `<rdt:rule xml:lang="zxx"`<br>`xmlns:rdt="http://marklogic.com/xdmp/redaction">`<br>`<rdt:description>Mask names</rdt:description>`<br>`<rdt:path>//name</rdt:path>`<br>`<rdt:method>`<br>`<rdt:function>redact</rdt:function>`<br>`<rdt:module>/example/redact-name.xgy</rdt:module>`<br>`<rdt:module-namespace>`<br>`   http://marklogic.com/example/redaction`<br>`</rdt:module-namespace>`<br>`</rdt:method>`<br>`</rdt:rule>` |
| JSON | `{"rule": {`<br>`"description": "Mask names", "path": "//name",`<br>`"method": {`<br>`"function": "redact",`<br>`"module": "/example/redact-name.sjs"`<br>`}`<br>`}}` |

Redaction usually changes content in one of the following ways:

Partial masking: Replace only a portion of the redacted value. For example, replace all but the last 4 digits in a credit card number with the character "#".

Full masking: Replace the entire redacted value with a new value. For example, replace all characters in an account number with a random string of characters.

Concealment: Completely eliminate the redacted value or node. When using masking, you should also consider the following points:

Should the replacement value always be the same for a given input (deterministic), or should it be randomized? Deterministic masking can preserve relationships between values and facilitate searches, which can be either beneficial or undesirable, depending on the application.

A redaction function implements the logic of a given redaction rule, such as determining whether or not a node needs to be modified, generating a replacement value, or hiding a value or node. You can use one of the built-in redaction functions or create a user-defined redaction function.

The following built-in redaction functions may be used in accordance with embodiments of the invention.

mask-deterministic
mask-random
conceal
redact-regex
redact-us-ssn
redact-us-phone
redact-email
redact-ipv4

If the built-in functions do not meet the needs of an application, one can create a custom redaction function using XQuery or Server-Side JavaScript. For example, you might need a user-defined function to implement conditional redaction such as "redact the name if the customer is a minor".

The XML and JSON document models differ in ways that can be surprising if you are not familiar with the models. For example, a simple path expression such as "//id" might match an element in an XML document, but all the items in an array value in JSON.

The built-in redaction functions compensate for differences in the JSON and XML document models in most cases, so they behave in a consistent way regardless of document type. If you write your own redaction functions, you might need to make similar adjustments.

You can write a single XPath expression that selects nodes in both XML and JSON documents, but if you do not understand the document models thoroughly, it might not select the nodes you expect. Keep the following tips in mind:

XML and JSON contain different node types. Only XML documents contain element and attribute nodes; only JSON documents contain object, text, number, boolean, and null nodes. Thus, an expression such as "//@color" will never match nodes in a JSON document, even if the document contains a "color" property.

There is no "JSON property node". A JSON document such as {"a": 42} is modeled as an unnamed root object node with a single number node child. The number node is named "a" and has the value 42. You can change the value of the number node, but you can only conceal the property by manipulating the parent object node.

Each item in a JSON array is a node with same name. For example, given {"a": [1,2]}, the path expression "//a" selects two number nodes, not the containing array node. Selecting the array node requires a JSON specific path expression such as "//array-node('a')". Thus, concealing an array-valued property requires a different strategy than concealing, say, a string-valued property.

The fn:data( ) function aggregates text children of XML elements, but does not do so for JSON properties.

Any redaction function that can receive input from both XML and JSON must be prepared to handle multiple node types. For example, the same XPath expression might select an element node in XML, but an object node in JSON.

Once one or more rule documents are installed in the Schemas database and are assigned to a collection, one can redact documents in the following ways:

Exporting documents from a database using a command line tool.

Copying documents between databases using a command line tool.

Calling the XQuery function rdt:redact function.

Calling the Server-Side JavaScript function rdt.redact.

The command line tool provides the highest throughput, but you may find rdt:redact or rdt.redact convenient when developing and debugging rules.

Mask-deterministic is a built-in function to mask a value with a consistent masked value. That is, with deterministic masking, a given input always produces the same output. The original value is not derivable from the masked value. Deterministic masking can be useful for preserving relationships across records. For example, you could mask the names in a social network, yet still be able to trace relationships between people (X knows Y, and Z knows Y).

Use the following parameters to configure the behavior of this function. Set parameters in the options section of a rule.

length: The length, in characters, of the output value to generate. Optional. Default: 64.

Mask-random is a built-in function to replace a value with a random masking value. A given input produces different output each time it is applied. The original value is not derivable from the masked value. Random masking can be useful for obscuring relationships across records.

Use the following parameters to configure the behavior of this function. Set parameters in the options section of a rule.

length: The length, in characters, of the output value to generate. Optional. Default: 64.

Mask-dictionary substitutes the original value with a string (any text or numerical value) from a list of predefined strings that form a dictionary. Consider the following dictionary {John, Matt, Tanya, Chris, Haitao, Fayez . . . }. The document to redact is <name>Caio</name>. Random dictionary masking would replace "Caio" with a random value from the dictionary. Therefore, every time a document is exported a different value from the dictionary is substituted for "Caio"

Deterministic dictionary masking would replace "Caio" with a specific value from the dictionary, such as "Matt". That is, every time data is exported, the same substitute value is used as a replacement for the original value. In one embodiment, a user may specify a key-value pairing, such as "Caio"="Matt". Alternately, the key-value pairing may be programmatically established. Deterministic matching allows masked data to have the same cardinality as a source without the risk of exposing any key-value table that would allow users to reverse the data.

The following example rule applies dictionary to values selected by the path expression //name.

| XML | JSON |
|---|---|
| <rule xml:lang="zxx" xmlns="http://marklogic.com/xdmp/redaction"><br><path>//name</path><br><method><br><function>conceal</function><br></method><br><options><br><dictionary>/rules/dict/names.xml</dictionary><br></options> | {"rule": {<br>"path": "//name",<br>"method": {<br>"function":<br>"mask-deterministic",<br>},<br>"options": {<br>"dictionary":<br>/rules/dict/names.xml<br>}<br>}} |

A redaction dictionary is an XML or JSON document with the form specified below (same sample data in the document).

| Format | Syntax |
|---|---|
| XML | <dictionary xmlns="http://marklogic.com/xdmp/redaction"><br>  <entry>John</entry><entry>Matt</entry><br>  <entry>Caio</entry><br>  <entry>Fayez </entry><br>  <entry>Haitao </entry><br>  <entry>Chris </entry><br>  <entry>Tanya </entry><br>  . . .<br></dictionary> |
| JSON | {"dictionary": {<br>"entry": [<br>John,<br>Matt,Caio,Fayez,Haitao,Chris,Tanya, . . .<br>]<br>}} |

The value must be atomic. That is:

In XML, the entry value can be any text (word, phrase, date, decimal, etc.).

In JSON, the value can be a string, number, or boolean value.

The following table illustrates the effect of applying dictionary to several different types of nodes.

| Path Expr | Fmt | Original Document | Redacted Result |
|---|---|---|---|
| //name<br>Simple atomic value | XML | <person><br><name><br>Little Bopeep<br></name><br><id>12-3456789</id><br></person> | <person><br><name><br>Caio<br></name><br><id>12-3456789</id><br></person> |
| | JSON | {"name": "Jack Sprat", "id": "45-6789123"} | {"name": "Matt", "id": "45-6789123"} |
| //alias<br>Multiple items (array in JSON) | XML | <person><br><alias>Peepers</alias><br><alias>Bo</alias><br><id>12-3456789</id><br></person> | <person><br><alias>Tanya</alias><br><alias>Chris</alias><br><id>12-3456789</id><br></person> |
| | JSON | {"alias": [<br>"George",<br>"G.P."<br>],<br>"id": "45-6789123"<br>} | {"alias": [<br>"Haitao",<br>"G.P."<br>],<br>"id": "45-6789123"<br>} |
| | JSON | {"address": {<br>"street": "300 Nursery Lane",<br>"city": "Hometown",<br>"country": "Neverland"<br>},<br>"id": "45-6789123"<br>} | {"address": {<br>"street":"300 Nursery Lane",<br>"city": "Hometown",<br>"country": "Neverland"<br>},<br>"id": "45-6789123"<br>} |

Conceal is a built-in function to entirely remove a selected value. The following example rule applies concealment to values selected by the path expression //name.

| XML | JSON |
|---|---|
| <rule xml:lang="zxx"<br>xmlns="http://marklogic.com/xdmp/redaction"><br><path>//name</path><br><method> | {"rule": {<br>"path": "//name",<br>"method": {<br>"function": "conceal", |

-continued

| XML | JSON |
|---|---|
| <function>conceal</function><br></method><br></rule> | }<br>} } |

The following table illustrates the effect of applying conceal to several different types of nodes.

| Path Expr | Fmt | Original Document | Redacted Result |
|---|---|---|---|
| //name<br>Simple atomic value | XML | <person><br><name><br>Little Bopeep<br></name><br><id>12-3456789</id><br></person> | <person><br><id>12-3456789</id><br></person> |
| | JSON | {"name": "Jack Sprat",<br>"id": "45-6789123"<br>} | {"id": "45-6789123"} |
| //alias<br>Multiple items (array in JSON) | XML | <person><br><alias>Peepers</alias><br><alias>Bo</alias><br><id>12-3456789</id><br></person> | <person><br><id>12-3456789</id><br></person> |
| | JSON | {"alias": [ "George",<br>"G.P."<br>]<br>"id": "45-6789123"<br>} | {"alias":[ ]<br>"id": "45-6789123"<br>} |
| //address<br>Complex value | XML | <person><br><address><br><street><br>100 Nursery<br></street><br><city>Hometown</city><br><country>Neverland<br></country><br></address><br><id>12-3456789</id><br></person> | <person><br><id>12-3456789</id><br></person><br>Lane |
| | JSON | {"address": {<br>"street": "300 Nursery Lane",<br>"city": "Hometown",<br>"country": "Neverland"<br>},<br>"id": "45-6789123"<br>} | { "id": "45-6789123"} |

In most cases, the entire selected node is concealed, even if the original contents are complex, such as the //address example, above.

Redact-us-ssn is a built-in function to mask values that conform to one of the following patterns. These patterns correspond to typical representations for US Social Security Numbers (SSNs). The character N in these patterns represents a single digit in the range 0-9.

NNN-NN-NNNN (dash separator)

NNN.NN.NNNN (dot separator)

NNN NN NNNN (space separator)

NNNNNNNNN

When a pattern match is found, every redacted digit is replaced with the same character. For example, a value such as "123-45-6789" might become "XXX-XX-XXXX", depending on the rule configuration.

You can use the following parameters to configure the behavior of this function. Set parameters in the options section of a rule.

level: How much to redact. Allowed values: full, partial. Partial redaction preserves the last 4 digits. Optional. Default: full.

character: The character with which to replace each redacted digit. Optional. Default: "#".

| XML | JSON |
|---|---|
| <rule xml:lang="zxx"<br>xmlns="http://marklogic.com/xdmp/redaction"?+0<br><path>//id</path><br><method><br><function>redact-us-ssn</function><br></method><br><options><br><level>partial</level><br><character>X</character><br></options><br></rule> | {"rule": {<br>"path": "//id", "method": {<br>"function": "redact-us-ssn",<br>},<br>"options": {<br>"level": "partial", "character": "X"<br>}<br>} } |

The following table illustrates the effect of applying redact-us-ssn with various input values and configuration parameters.

| Configuration | Fmt | Original Document | Redacted Result/ |
|---|---|---|---|
| Path: //ssn<br>Level: full<br>Char: #<br>(default) | XML | <pii><br><ssn>123-45-6789</ssn><br><ssn>123.45.6789</ssn><br><ssn>123456789</ssn><br></pii> | <pii><br><ssn>###-##-####</ssn><br><ssn>###.##.####</ssn><br><ssn>#########</ssn><br></pii> |
| | JSON | {"pii": {<br>ssn: [<br>"123-45-6789",<br>"123.45.6789",<br>"123456789"<br>]<br>}} | {"pii": {<br>ssn: [<br>"###-##-####",<br>"###.##.####", "#########"<br>]<br>}} |
| Path: //ssn<br>Level: partial | XML | <pii><br><ssn>123-45-6789</ssn><br><ssn>123.45.6789</ssn><br><ssn>123456789</ssn><br></pii> | <pii><br><ssn>###-##-6789</ssn><br><ssn>#####.6789</ssn><br><ssn>#####6789</ssn><br></pii> |
| | JSON | {"pii": {<br>ssn: [<br>"123-45-6789",<br>"123.45.6789", | {"pii": {<br>ssn:[<br>"###-##-6789"<br>"###.##.6789", "#####6789" |

-continued

| Configuration | Fmt | Original Document | Redacted Result/ |
|---|---|---|---|
| | | "123456789"<br>[<br>}} | ]<br>}} |
| Path: //ssn<br>Level: full<br>Character: X | XML | <pii><br><ssn>123-45-6789</ssn><br><ssn>123.45.6789</ssn><br><ssn>123456789</ssn><br></pii> | <pii><br><ssn>XXX-XX-XXXX</ssn><br><ssn>XXX.XX.XXXX</ssn><br><ssn>XXXXXXXXX</ssn><br></pii> |
| | JSON | {"pii": {<br>ssn: [<br>"123-45-6789",<br>"123.45.6789",<br>"123456789"<br>]<br>}} | {"pii": {<br>ssn:[<br>"XXX-XX-XXXX",<br>"XXX.XX.XXXX",<br>"XXX.XX.XXXX"<br>]<br>}} |

Redact-us-phone is a built-in function to mask values that conform to one of the following patterns. These patterns correspond to typical representations for US telephone numbers. The character N in these patterns represents a single digit in the range 0-9.

NNN-NNN-NNNN ("-" separator)
NNN.NN.NNNN ("." separator)
(NNN)NNN-NNNN (no whitespace allowed)
NNNNNNNNN When a pattern match is found, every redacted digit is replaced with the same character. For example, a value such as "123-456-7890" might become "XXX-XXX-XXXX", depending on the configuration of the rule.

Redact-email is a built-in function to mask values that conform to the pattern of an email address. The function assumes an email has the form name@domain.

Use the following parameters to configure the behavior of this function. Set parameters in the options section of a rule.

level: How much of each email address to redact. Allowed values: full, name, domain.

Optional. Default: full.

Redacting the username portion of an email address replaces the username with "NAME". Redacting the domain portion of an email address replaces the domain name with "DOMAIN". Thus, full redaction on the email address "jsmith@example.com" produces the replacement value "NAME@DOMAIN".

The following example rule fully redacts email addresses selected by the path expression "//email".

| XML | JSON |
|---|---|
| <rule xml:lang="zxx"<br>xmlns="http://marklogic.com/xdmp/redaction"><br><path>//email</path><br><method><br><function>redact-email</function><br></method><br><options><br><level>full</level><br></options><br></rule> | {"rule": {<br>"path": "//email", "method": {<br>"function": "redact-email",<br>},<br>"options": {"level": "full"<br>}<br>}} |

The following table illustrates the effect of applying redact-email with various levels of redaction.

| Configuration | Fmt | Original Document | Redacted Result |
|---|---|---|---|
| //email<br>level: full<br>(default) | XML | <person><br><email><br>bopeep@mothergoose.com<br></email><br></person> | <person><br><email>NAME@DOMAIN<br></email><br></person> |
| | JSON | {"email":<br>"gp@mothergoose.com"<br>} | {"email": "NAME@DOMAIN"} |
| //email<br>level: name | XML | <person><br><email><br>bopeep@mothergoose.com<br></email><br></person> | <person><br><email>NAME@mothergoose.com<br></email><br></person> |
| | JSON | {"email":<br>"gp@mothergoose.com"<br>} | {"email":<br>"NAME@mothergoose.com"<br>} |
| //email<br>level:<br>domain | XML | <person><br><email><br>bopeep@mothergoose.com<br></email><br></person> | <person><br><email><br>bopeep@DOMAIN<br></email><br></person> |
| | JSON | {"email":<br>"gp@mothergoose.com"<br>}} | {"email": "gp@DOMAIN"} |

Redact-ipv4 is a built-in function to mask values that conform to the pattern of an IP address. This function only redacts IPv4 addresses. That is, a value is redacted if it conforms to the following pattern, where N represents a decimal digit (0-9).

Four blocks of 1-3 decimal digits, separated by period ("."). The value of each block of digits must be less than or equal to 255. For example: 123.201.098.112, 123.45.678.0.

The redacted IP address is normalized to contain characters for the maximum number of digits. That is, an IP address such as 123.4.56.7 is masked as "###.###.###.###".

Use the following options to configure the behavior of this function. Set parameters in the options section of a rule.

character: The character with which to replace each redacted digit. Optional. Default: "#".

The following example rule redacts IP addresses selected by the path expression //ip. The character parameter specifies the digits of the redacted IP address are replaced with "X".

| XML | JSON |
|---|---|
| <rule xml:lang="zxx" xmlns="http://marklogic.com/xdmp/redaction"><br><path>//ip</path><br><method><br><function>redact-email</function><br></method><br><options><br><character>X</character><br></options><br></rule> | {"rule": {<br>"path": "//ip", "method": {<br>"function": "redact-email",<br>},<br>"options": { "character": "X"<br>}<br>} } |

The following table illustrates the effect of applying redact-ipv4 with various configuration options.

| Configuration | Fmt | Original Document | Redacted Result |
|---|---|---|---|
| //ip default | XML | <person><br><ip>123.45.6.78</ip><br></person> | <person><br><ip>###.###.###.###</ip><br></person> |
| | JSON | {"ip": "123.45.6.78"} | {"ip": "###.###.###.###"} |
| //ip character: X | XML | <person><br><ip>123.45.6.78</ip><br><ip>123.145.167.189</ip><br></person> | <person><br><ip>XXX.XXX.XXX.XXX</ip><br><ip>XXX.XXX.XXX.XXX</ip><br></person> |
| | JSON | {"ip": ["123.45.6.78",<br>"123.145.167.189"<br>] } | {"ip": [<br>"XXX.XXX.XXX.XXX",<br>"XXX.XXX.XXX.XXX"<br>] } |

Redact-regex is a built-in function to mask values that match a regular expression. The regular expression and the replacement text are configurable.

Use the following options to configure the behavior of this function:

pattern: A regular expression identifying the values to be redacted. Use the regular expression language syntax defined for XQuery and XPath.

replacement: The text with which to replace values matching pattern.

The pattern and replacement text are applied to the input values as if by calling the fn:replace XQuery function or the fn.replace Server-Side JavaScript function.

Note that the replacement pattern can contain back references to portions of the matched text. A back reference enables you to "capture" portions of the matched text and re-use them in the replacement value.

Regular expression patterns can contain characters that require escaping in your rule definitions. The following contains a few examples of problem characters. This is not an exhaustive list.

Curly braces ("{ }") in pattern in an XML rule installed with XQuery must be escaped as "{{" and "}}" to prevent the XQuery interpreter from treating them as code block delimiters.

A left angle bracket ("<") in an XML rule must be replaced by the entity reference "&lt;".

Backslashes ("\") in a JSON rule definition must be escaped as "\\" because "\" is a special character in JSON strings.

The following example redacts text which has one of the following forms, where N represents a single digit in the range 0-9.

NN-NNNNNNN (dash separator)
NN.NNNNNNN (dot separator)
NN NNNNNNN (space separator)
NNNNNNN The following regular expression matches the supported forms:

\d{2} [-.\s] \d{7}

The following rule specifies that values in an id XML, element or JSON property that match the pattern should be replaced with the text "NN-NNNNNNN". Notice the escaped characters in the pattern.

| XML | JSON |
|---|---|
| <rule xml:lang="zxx" xmlns="http://marklogic.com/xdmp/redaction"><br><path>//id</path> | {"rule": {<br>"path": "//id", "method": {<br>"function": "redact-regex",<br>}, |

-continued

| XML | JSON |
|---|---|
| <method><br><function>redact-regex</function><br></method><br><options><br><pattern><br>\d{{2}}[-.\s]\d{{7}}<br></pattern><br><replacement>NN-NNNNNNN</replacement><br></options><br></rule> | "options": {"pattern":<br>"\\d{2}[-.\\s]\\d{7}",<br>"replacement":<br>"NN-NNNNNNN"<br>}<br>} } |

The table below illustrates the result of applying the rule to documents matching the rule.

| Format | Original Document | Redacted Result |
| --- | --- | --- |
| XML | <person><br><id>12-3456789</id><br></person> | <person><br><id>NN-NNNNNNN</id><br></person> |
| JSON | {"id": "12-3456789"} | {"id": "NN-NNNNNNN"<br>} } |

A user-defined function can be implemented in XQuery or Server-Side JavaScript. Your implementation must conform to one of the following interfaces:

| Language | Interface |
| --- | --- |
| XQuery | declare function yourNS:yourFunc (<br>$node as node( ),<br>$options as map:map<br>) as node( )? |
| Server-Side JavaScript | function yourFunc (node, options)<br>// where:<br>// node is a Node<br>// options is an Object with paramName:value properties<br>// return 1 Node or nothing |

The input node parameter is the node selected by the XPath expression in a rule using your function. The options parameter can be used to pass user-defined data from the rule into your function. Your function should return a node (redacted or not) or nothing.

Your function should be defined in an XQuery or JavaScript library module. The module should be installed in the modules database associated with the App Server through which redaction will be applied.

The following table contains module templates suitable for defining your own conforming module.

| Language | Interface |
| --- | --- |
| XQuery | xquery version "1.0-ml";<br>module namespace yourNS = "/your/module/namespace";<br>declare function yourNS:redact(<br>$node as node( ),<br>$options as map:map<br>) as node( )?<br>{<br>(: your implementation here :)<br>}; |
| Server-Side JavaScript | function yourFunc(node, options)<br>{<br>// your implementation here<br>}<br>exports.redact = yourFunc |

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
store a semi-structured document database including a collection of documents having semi-structured data formats,
define data redaction rules, wherein each data redaction rule includes a redaction type and a path expression to a redaction location within a semi-structured data format of a document within the collection of documents,
apply the data redaction rules to form redacted documents, and
supply the redacted documents.

2. The apparatus of claim 1 wherein the collection of documents includes XML, documents and JSON documents.

3. The apparatus of claim 1 wherein the data redaction rules include a regular expression redaction rule.

4. The apparatus of claim 1 wherein the data redaction rules include a United States Social Security Number redaction rule.

5. The apparatus of claim 1 wherein the data redactions rules include a United States telephone number redaction rule.

6. The apparatus of claim 1 wherein the data redaction rules include an email address redaction rule.

7. The apparatus of claim 1 wherein the data redaction rules include an internet protocol address redaction rule.

8. The apparatus of claim 1 wherein the path expression is specified as an XQuery® function.

9. The apparatus of claim 1 wherein the path expression is specified as a JavaScript® function.

10. The apparatus of claim 1 wherein the redaction type is masking.

11. The apparatus of claim 10 wherein masking is full masking of an original value at the redaction location.

12. The apparatus of claim 10 wherein masking is partial masking of an original value at the redaction location.

13. The apparatus of claim 10 wherein masking substitutes an original value at the redaction location with a string from a collection of strings the form a dictionary.

14. The apparatus of claim 10 wherein masking is deterministic masking such that a specified value at the redaction location is substituted with a predetermined redacted output value.

15. The apparatus of claim 10 wherein masking is random masking of an original value at the redaction location.

16. The apparatus of claim 10 wherein masking conceals an original value at the redaction location.

* * * * *